(12) United States Patent  
Sobik (10) Patent No.: US 8,668,242 B2
(45) Date of Patent: Mar. 11, 2014

(54) REMOVABLE VALANCE FOR A GOLF CART

(75) Inventor: Francis A. Sobik, Tarpon Springs, FL (US)

(73) Assignee: Nivel Holdings, LLC, Jacksonville, FL (US)

( * ) Notice: Subject to any disclaimer, the term of this patent is extended or adjusted under 35 U.S.C. 154(b) by 0 days.

(21) Appl. No.: 13/204,692

(22) Filed: Aug. 7, 2011

(65) Prior Publication Data

US 2014/0035313 A1     Feb. 6, 2014

(51) Int. Cl.
*B60J 7/20* (2006.01)

(52) U.S. Cl.
USPC .......... 296/135; 160/25; 280/DIG. 5; 296/83; 296/141

(58) Field of Classification Search
USPC ........... 296/79, 80, 83, 138, 141, 145, 135; 280/DIG. 5; 160/24, 25, 31, 23, 1
See application file for complete search history.

(56) References Cited

U.S. PATENT DOCUMENTS

| | | | |
|---|---|---|---|
| 4,033,397 A * | 7/1977 | McKee | 160/393 |
| 4,258,778 A * | 3/1981 | Upton et al. | 160/383 |
| 5,732,755 A * | 3/1998 | Cross | 160/57 |
| 5,788,317 A | 8/1998 | Nation | |
| 5,913,564 A * | 6/1999 | Stewart et al. | 296/172 |
| 6,007,134 A | 12/1999 | Weston | |
| 6,158,801 A | 12/2000 | Tucker | |
| 6,979,044 B2 * | 12/2005 | Tyrer | 296/100.14 |
| 7,354,092 B2 * | 4/2008 | Showalter et al. | 296/77.1 |
| 7,448,666 B2 * | 11/2008 | Tyrer | 296/100.14 |
| 2008/0128671 A1 * | 6/2008 | Lyons | 256/25 |
| 2011/0168340 A1 * | 7/2011 | Squillante | 160/330 |

FOREIGN PATENT DOCUMENTS

WO     WO 2011119715     9/2011

OTHER PUBLICATIONS

Canadian Patent Office Action in Canadian Patent App No. 2,784,161, Nov. 29, 2013.

* cited by examiner

*Primary Examiner* — Jason S Morrow
*Assistant Examiner* — E Turner Hicks
(74) *Attorney, Agent, or Firm* — Weiss & Arons LLP (57) ABSTRACT

Systems and methods for providing a removable valance for a golf cart are provided. The apparatus may include a valance for use with a golf cart. The valance may include a bead configured to be inserted into a slot on a golf cart. The slot is preferably configured to engage the bead. The valance may further include material fixedly attached to the bead along a longitudinal axis of the bead.

15 Claims, 7 Drawing Sheets

FIG. 10

REMOVABLE VALANCE FOR A GOLF CART

FIELD OF TECHNOLOGY

This invention relates to a golf cart enclosure. More specifically, this invention relates to a track style golf cart enclosure.

BACKGROUND OF THE INVENTION

Many types of golf cart enclosures exist that are designed to protect a golf cart user from rain and cold weather. These golf cart enclosures typically include a valance and one or more enclosure panels. Two basic methods exist for affixing the valance and enclosure panels to the roof of a golf cart: the over the top method and the track style method.

A golf cart enclosure that is attached to a golf cart using the track style method typically includes a valance that is permanently sewn or bonded to one or more enclosure panels. The joined enclosure panels and valance are affixed to a golf cart roof by a single track and bead.

Because a track style golf cart enclosure includes a valance that is permanently attached to the golf cart enclosure panels, a golf cart user is unable to change the valance without having to repair or replace the enclosure panels. This is not desirable at least because a golf cart valance is a key decorative element of a golf cart enclosure, and a golf cart user may want to change the valance frequently for stylistic or sentimental purposes.

It would be desirable, therefore, to provide systems and methods to enable a golf cart user to easily change a golf cart valance without having to repair or replace the golf cart enclosure panels.

SUMMARY

Systems and methods for providing a removable valance for use with a golf cart are provided. The apparatus may include an apparatus for supporting a valance and a golf cart enclosure. Such apparatus may include a metal sheet, or other suitable hard material, configured to be attached to a golf cart. The metal sheet, or other suitable hard material, may include a first track and a second track. The first track may include a slot that is configured to maintain the valance in a first position. The second track may include a slot that is configured to maintain the golf cart enclosure in a first position.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

The systems and methods of the invention relate to a track style golf cart enclosure. For the purposes of this disclosure, a track style golf cart enclosure is a golf cart enclosure that is attached to a golf cart using a track. While the systems of the invention described herein relate to a golf cart, it should be noted that the systems of the invention may extend to any vehicle for which such systems are appropriate.

A typical track style golf cart enclosure includes a valance and one or more enclosure panels bound together. The attached valance and enclosure panels are affixed to a golf cart roof by a single track and bead. Because the valance and enclosure panels are bound together, a golf cart user who desires to change the valance of his golf cart must replace the enclosure panels as well.

The track style golf cart enclosure according to the invention enables a user to change the valance of his golf cart without having to change the golf cart enclosure panels. The enhanced track style golf cart enclosure according to the invention includes a valance and one or more enclosure panels. The valance according to the invention includes a bead configured to engage a track. The one or more enclosure panels according to the invention include a bead configured to engage a track.

The invention may additionally include a track. The track according to the invention may enable the valance and the enclosure panels to be installed separately and independently of one another. Thus, a valance according to the invention may be removed from the golf cart as an element separate from the enclosure panel without disrupting or removing the enclosure. In some embodiments of the invention, the track for the enclosures may be co-located on the same piece of material—e.g., sheet metal, plastic, extruded metal or any other suitable, sufficiently hard, material—as the track for the valance. Alternatively, each track may be formed from a separate piece of material.

The track according to the invention may include two slots: one for engaging the golf cart valance and one for engaging the one or more enclosure panels. The slot for engaging the golf cart valance may be positioned above or below the slot for engaging the one or more enclosure panels. The geometry and size of the two slots and/or the two beads configured to engage the slots may be similar. Alternately, geometry and size of the two slots and/or the two beads configured to engage the two slots may differ.

The track(s) may be attached to one or more sides and/or the front and/or back of the golf cart. The track(s) according to the invention may be attached to a golf cart during the assembly of a golf cart or after the golf cart has been assembled.

In certain embodiments of the invention, other means and methods of attachment of the valance and/or the golf cart enclosure to the golf cart may be used. For example there may be hook and loop and fasteners, such as Velcro ® strips, produced by the Velcro Company, having U.S. headquarters in Manchester, New Hampshire, for use with both an individual valance as well as an individual enclosure. Alternatively, snaps may be available for snapping on an individual valance as well as an individual enclosure.

In some embodiments of the invention, the valance may be attachable to the enclosure and the enclosure may be attachable to the golf cart. Such attachment of the valance to the enclosure may be obtained using hook and loop fasteners such as Velcro 200 strips, snaps, beads in tracks, or by another known attachment means.

Illustrative embodiments of apparatus and methods in accordance with the principles of the invention will now be described with reference to the accompanying drawings, which form a part hereof It is to be understood that other embodiments may be utilized and structural, functional and procedural modifications may be made without departing from the scope and spirit of the present invention.

Figure 1:
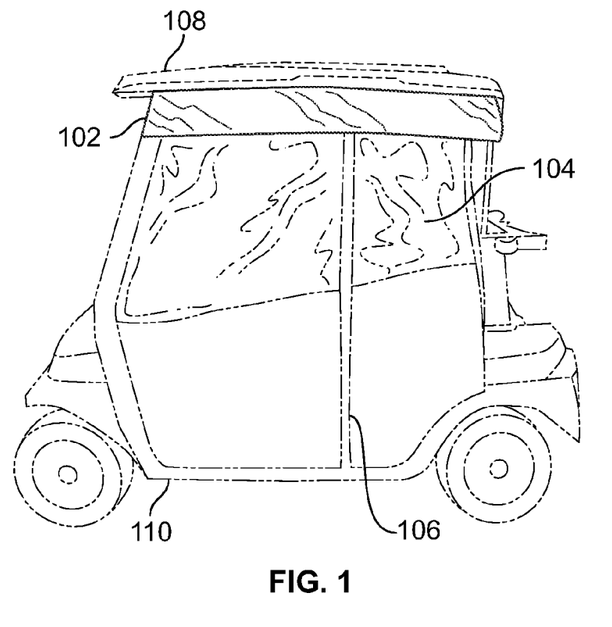
FIG. 1 shows apparatus that may be used in accordance with the systems and methods of the invention.

FIG. 1 shows an illustrative golf cart that may be used in accordance with the systems and methods of the invention. The golf cart illustrated in FIG. 1 includes valance 102 and enclosure panel 104. Valance 102 and enclosure panel 104 may be affixed between roof structure 108 and undercarriage 110 of the illustrative golf cart.

FIG. 1 additionally illustrates zipper/fastener 106. Zipper/faster 106 may be used to secure adjacent enclosure panels 104 together while allowing a golf cart user ingress into, and egress out of, a golf cart when necessary.

Figure 2:
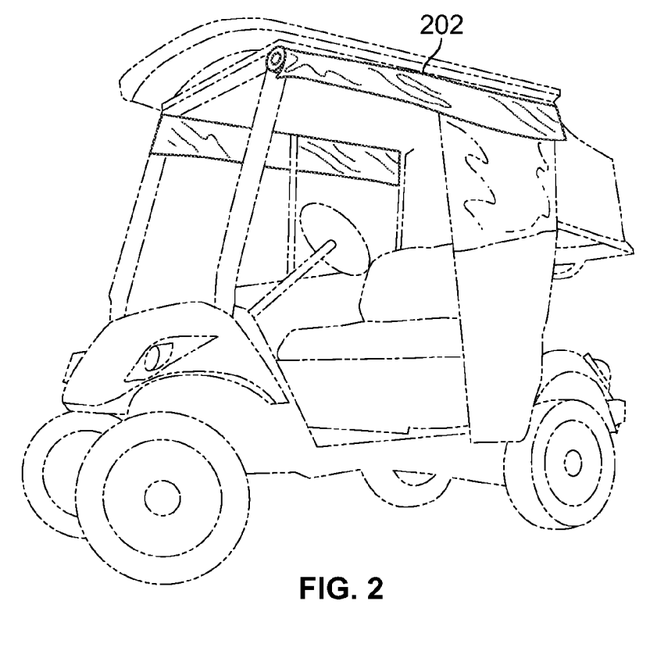
FIG. 2 shows apparatus that may be used in accordance with the systems and methods of the invention.

FIG. 2 illustrates apparatus that may be used in accordance with the systems and methods of the invention. Specifically, FIG. 2 illustrates that valance 202 may be used as a flap in which to roll up a golf cart enclosure when not in use.

Figure 3:
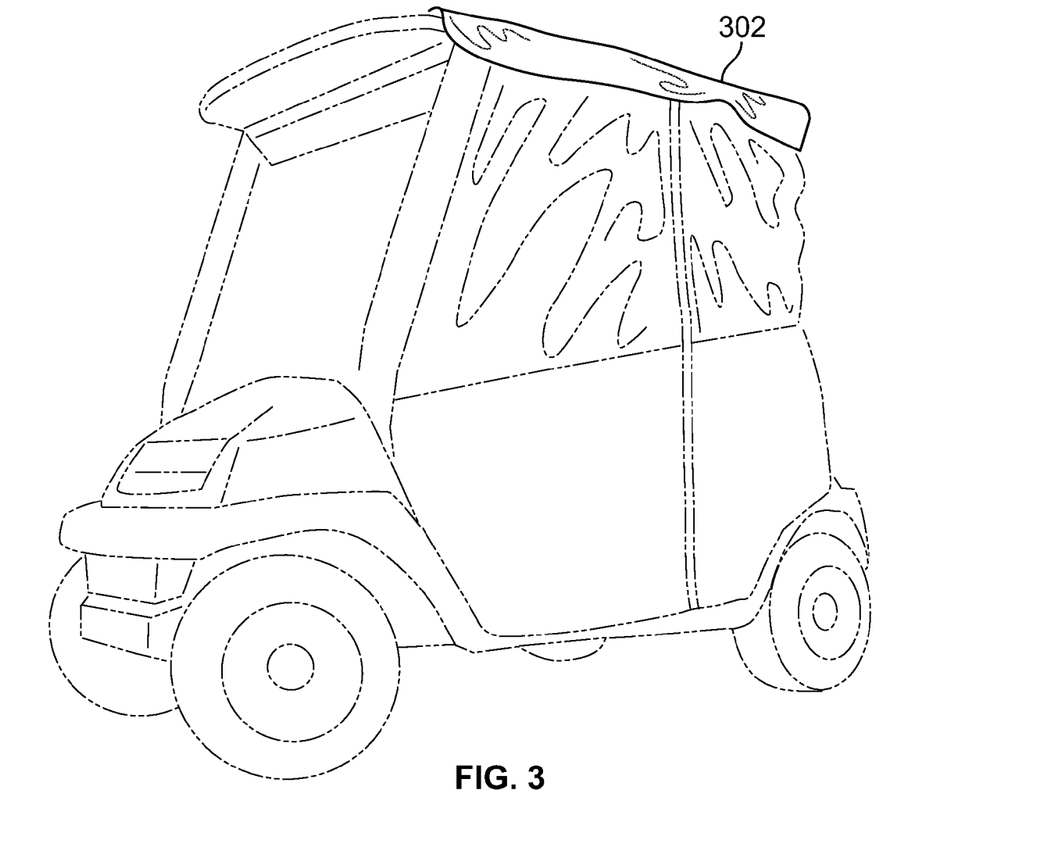
FIG. 3 shows additional apparatus that may be used in accordance with the systems and methods of the invention.

FIG. 3 illustrates additional apparatus that may be used in accordance with the systems and methods of the invention. FIG. 3 illustrates enclosure 302 that is attached to a golf cart using the "over-the-top" method. In the over-the-top method, the enclosure may be attached to the roof by a mechanism that is completely separate from the golf cart enclosure.

Figure 4:
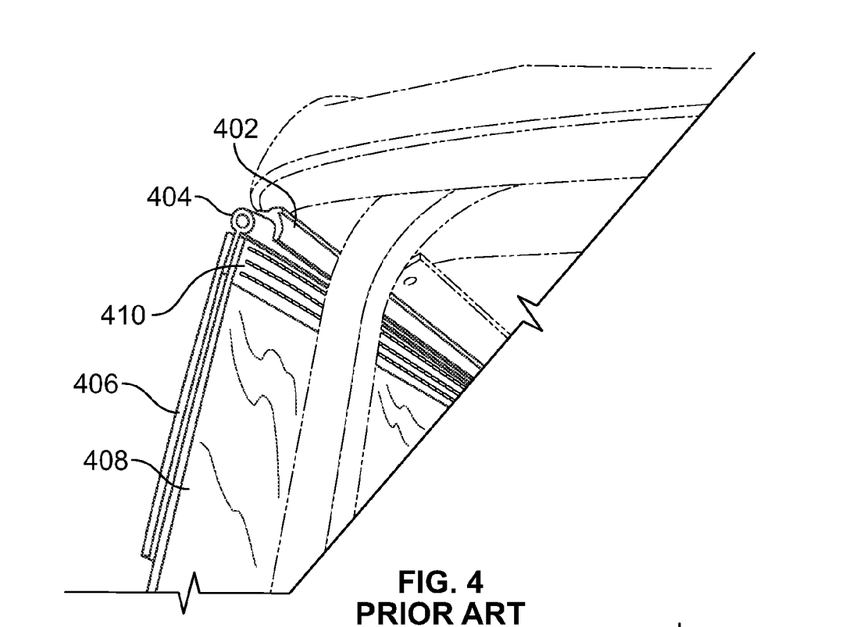
FIG. 4 shows apparatus associated with the prior art.

FIG. 4 illustrates conventional apparatus associated with a typical track style golf cart enclosure. The typical track style golf cart enclosure includes track 402 that includes a single track. The typical track style golf cart enclosure additionally includes bead 404 that is attached to both valance 406 and enclosure panel 408. Valance 406 and enclosure panel 408 are permanently sewn and bound together via bonding 410.

Figure 5:
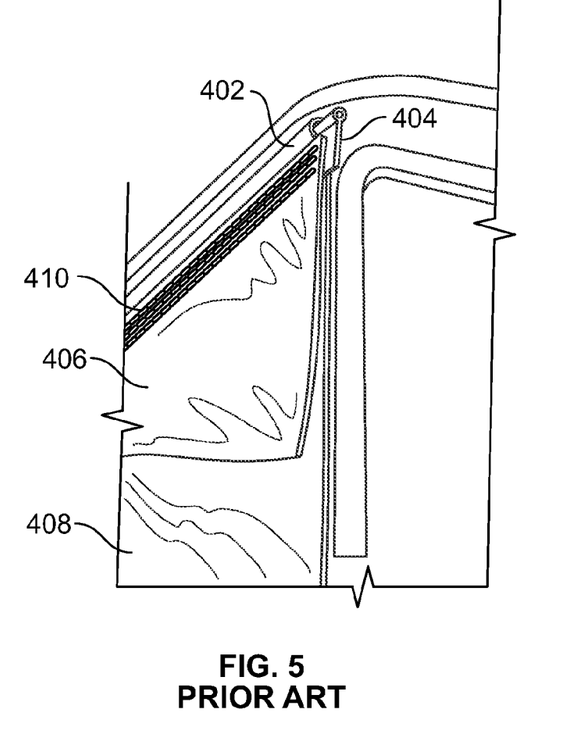
FIG. 5 shows additional apparatus associated with the prior art.

FIG. 5 illustrates a different view of the conventional apparatus associated with the typical track style golf cart enclosure illustrated in FIG. 4.

Figure 6:
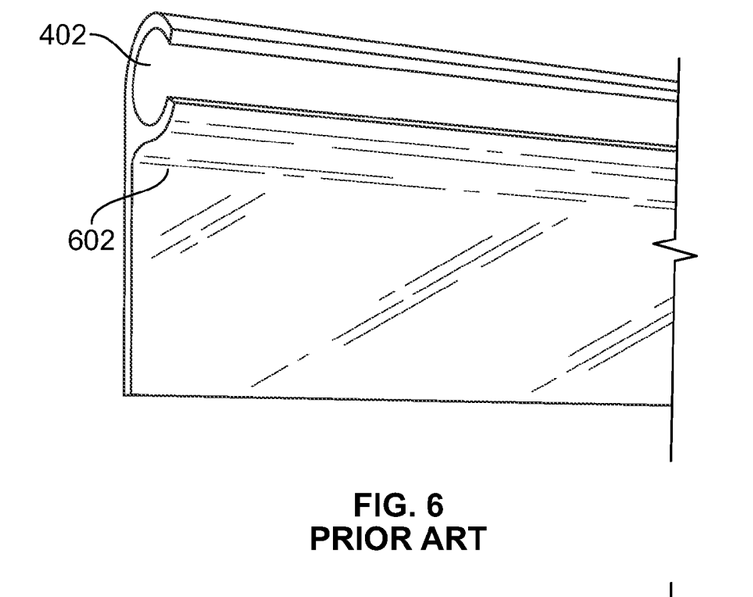
FIG. 6 yet other apparatus associated with the prior art.

FIG. 6 illustrates conventional track 402. Track 402 may be included in sheet metal, or other suitable hard material, fixture 602. Sheet metal 602, or other suitably hard material, may be attached to a golf cart to facilitate engaging a typical track style golf cart enclosure such as the enclosures illustrated in FIGS. 4 and 5.

Figure 7:
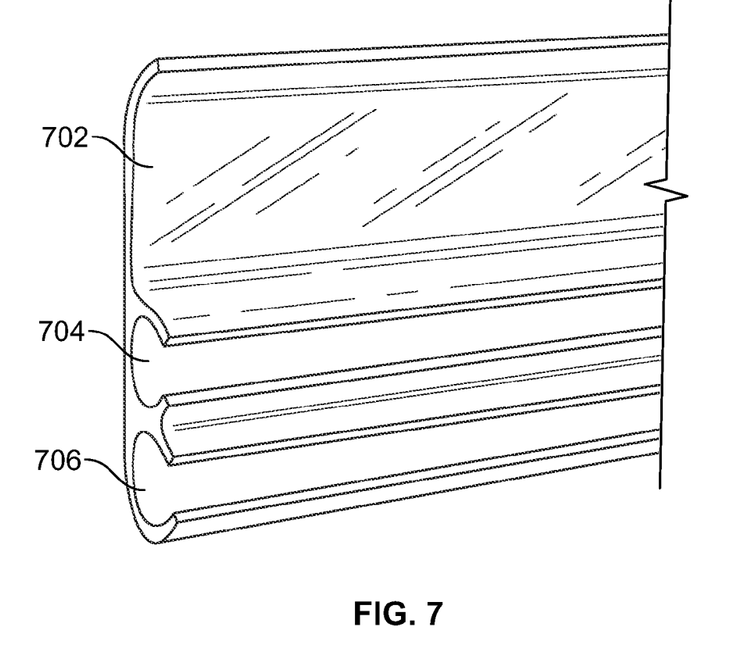
FIG. 7 shows apparatus in accordance with the principles of the invention.

FIG. 7 illustrates apparatus in accordance with the principles of the invention. FIG. 7 includes sheet metal, or other suitably hard material, fixture 702. Fixture 702 may be attached to a golf cart to facilitate installation and removal of an enhanced track style golf cart enclosure and valance in accordance with the systems and methods of the invention. Fixture 702 may include track 704 and track 706. Track 704 may be configured to engage a valance and/or enclosure panels. Track 706 may also be configured to engage a valance and/or enclosure panels. It should be noted that, in some embodiments, the size and geometry of tracks 704 and 706 may be similar. In other embodiments, the size and geometry of tracks 704 and 706 may differ.

Figure 8:
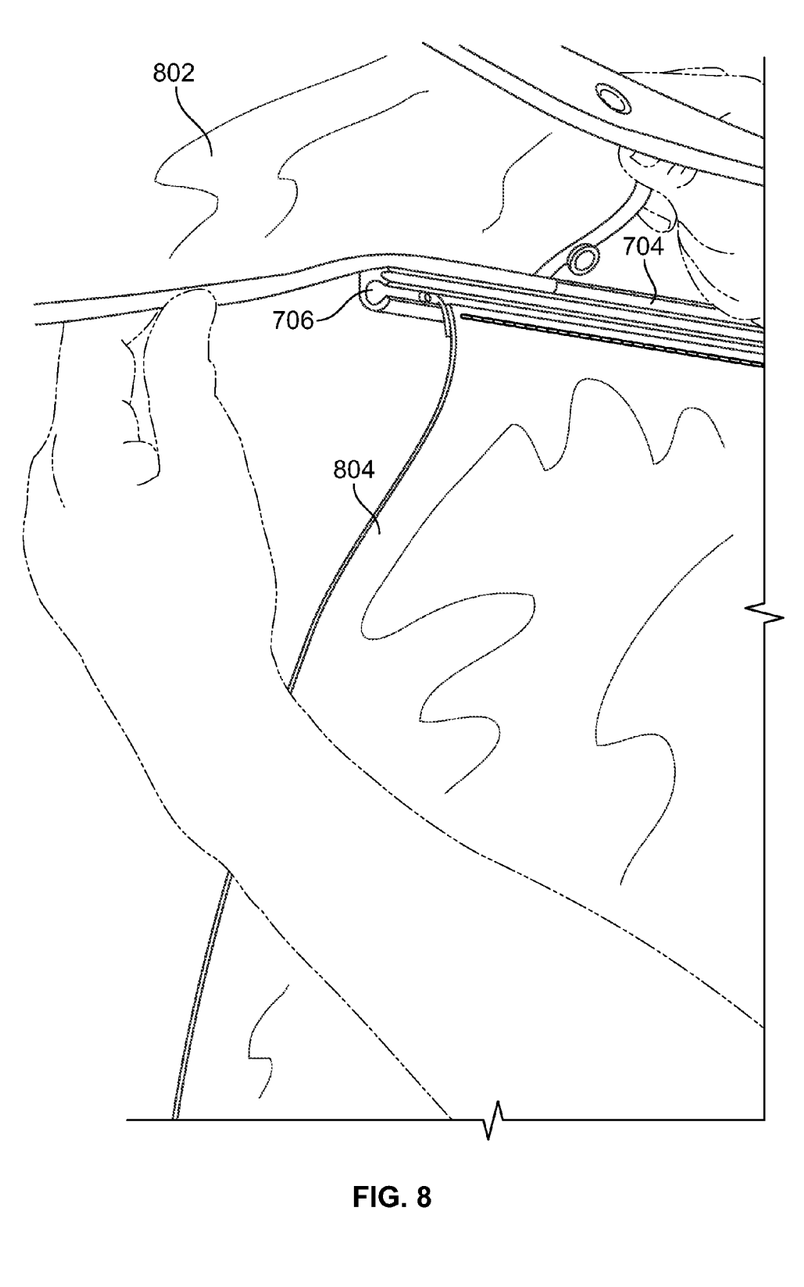
FIG. 8 shows a first installation position of a valance in accordance with the principles of the invention.

FIG. 8 shows a first installation position of a valance in accordance with the principles of the invention. The track for the valance 802 is shown at 704. The track for the enclosure 804 is shown at 706. FIG. 8 shows the initial installation of the valance 802 into track 704.

Figure 9:
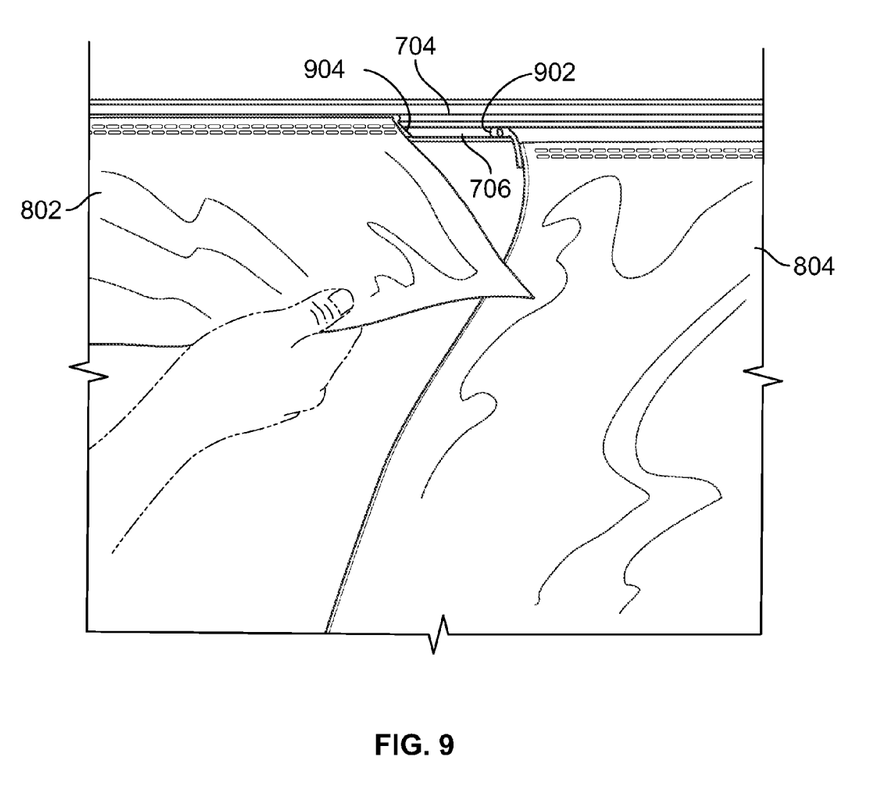
FIG. 9 shows a second installation position of a valance in accordance with the principles of the invention.

FIG. 9 shows a second installation position of a valance in accordance with the principles of the invention. FIG. 9 shows valance 802 after it has been inserted into track 704. The bead for valance 802 is shown as stitched on to valance 802 at 904. Bead 902 is stitched on to enclosure 804.

Figure 10:
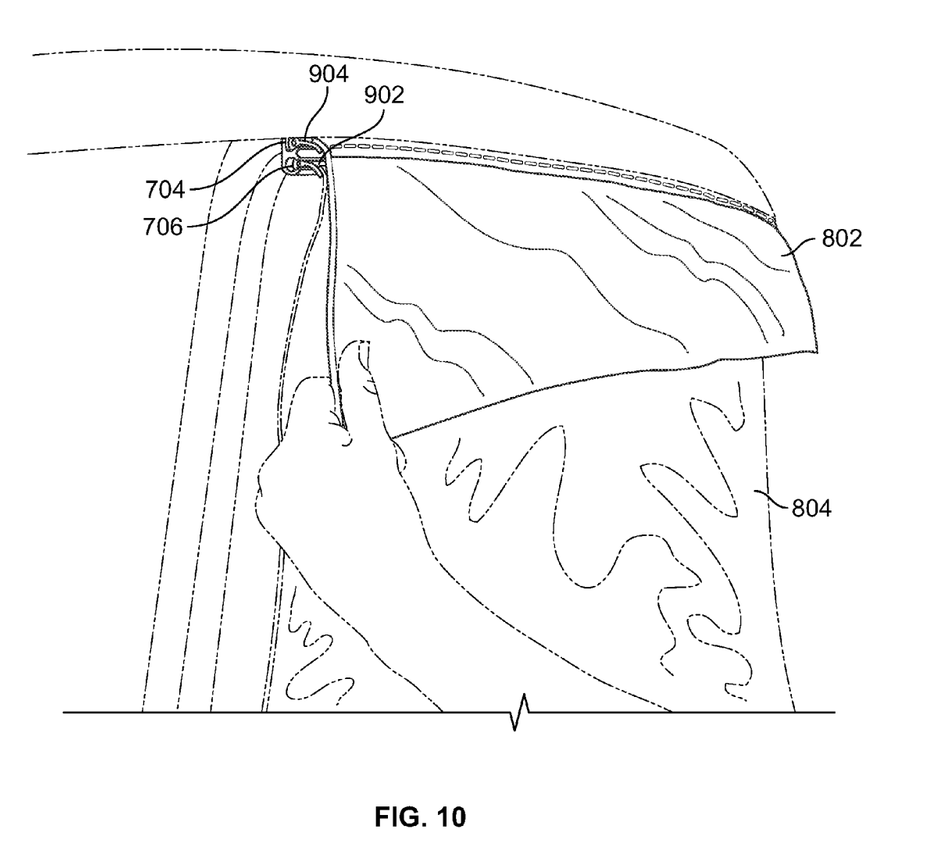
FIG. 10 shows a third installation position of a valance in accordance with the principles of the invention in accordance with the principles of the invention.

FIG. 10 shows a completed installation of a valance 802 into track 704 in accordance with the principles of the invention. The bead of valance 802 is secured to valance 802 at 904. The bead of enclosure 804 is also completely installed into track 706 and bound to enclosure 804 at 902.

Thus, methods and apparatus for an enhanced track style golf cart enclosure and valance in accordance with the systems and methods of the invention have been provided. Persons skilled in the art will appreciate that the present invention can be practiced in embodiments other than the described embodiments, which are presented for purposes of illustration rather than of limitation, and that the present invention is limited only by the claims that follow.

What is claimed is:

1. An apparatus for supporting a valance and a golf cart enclosure, the apparatus comprising:
an extruded metal fixture configured to be attached to a golf cart, the metal fixture comprising:
a first track; and
a second track; wherein:
the first track includes a first slot that is configured to maintain the valance in a first position;
the second track includes a second slot, that is configured to maintain the golf cart enclosure in a first position; and
the first slot and the second slot open in the same direction.

2. The apparatus of claim 1 wherein the valance and the golf cart enclosure are removably engaged with the first and second track, respectively.

3. The apparatus of claim 1 wherein the first track is configured to guide the valance from the first position to a second position.

4. The apparatus of claim 1 wherein the second track is configured to guide the golf cart enclosure from the first position to a second position.

5. The apparatus of claim 1 wherein the first slot in the first track is configured to mate with a bead affixed to the valance.

6. The apparatus of claim 1 wherein the second slot in the second track is configured to mate with a bead affixed to the golf cart enclosure.

7. A valance for use with a golf cart, the valance comprising:
a bead configured to be inserted into a first slot on a golf cart, the first slot that is configured to engage the bead, wherein the first slot is included on an extruded metal sheet configured to be attached to a golf cart; and
material fixedly attached to the bead along a longitudinal axis of the head; wherein;
upon insertion of the bead into the first slot, the material is configured to hang in a first plane;
the first plane is substantially parallel to a second plane, the second plane being a plane in which a golf cart enclosure is configured to hang upon insertion of the golf cart enclosure into a second slot included on the extruded metal sheet; and
the first slot and the second slot open in the same direction.

8. The valance of claim 7 wherein the material is stitched onto a portion of the bead.

9. The valance of claim 7 wherein the material is stitched onto a portion of the head that extends outside the first slot.

10. The valance of claim 7 wherein the bead comprises two portions:
- a first portion configured to be inserted into the first slot; and
- a second portion configured to be fixedly attached to the material.

11. A valance for use with a golf cart, the valance comprising:
- an attachment mechanism for attaching to an extruded metal fixture attached to the golf cart, the extruded metal fixture comprising a first track including a first slot and a second track including a second slot, wherein the first slot and the second slot open in the same direction; and
- material fixedly attached to the attachment mechanism; wherein:
  - the first slot is configured to engage the valance:
  - the second slot is configured to engage a full-length golf cart enclosure: and
  - the valance does not comprise, nor form part of, the full-length golf cart enclosure.

12. A method for manufacturing a golf cart, the method comprising:
- affixing a fixture to the golf cart, wherein the fixture comprises a first track and a second track, the fixture having a hardness sufficient to support a valance in the first track and a golf cart enclosure in the second track, wherein the first track and the second track open in the same direction:
- sliding a valance along the first track; and
- sliding a golf cart enclosure along the second track.

13. A method for assembling a golf cart, the method comprising:
- affixing an extruded metal fixture to the golf cart, the metal fixture that comprises a first track including a first slot and a second track including a second slot, wherein the first slot and the second slot open in the same direction;
- engaging the first track with a valance; and
- engaging the second track with a golf cart enclosure.

14. A golf cart comprising:
- a removable valance for use with the golf cart, the valance comprising:
  - an attachment mechanism for attaching to the golf cart; and
  - material fixedly attached to the attachment mechanizing; and
- a golf cart enclosure; wherein:
  - the removable valance is configured to engage a first track affixed to the golf cart;
  - the golf cart enclosure is configured to engage a second track affixed to the golf cart: and
  - the first track and the second track open in the same direction.

15. The golf cart of claim 14, wherein the attachment mechanism comprises a plastic bead.

* * * * *

UNITED STATES PATENT AND TRADEMARK OFFICE
CERTIFICATE OF CORRECTION

PATENT NO. : 8,668,242 B2  
APPLICATION NO. : 13/204692  
DATED : March 11, 2014  
INVENTOR(S) : Francis A. Sobik

Page 1 of 1

It is certified that error appears in the above-identified patent and that said Letters Patent is hereby corrected as shown below:

In the Claims

Col. 4, Claim 7, line 58, delete "head" and insert --bead--.
Col. 5, Claim 9, line 4, delete "head" and insert --bead--.
Col. 6, Claim 14, lines 19-20, delete "mechanizing" and insert --mechanism--.

Signed and Sealed this
Thirtieth Day of June, 2015

Michelle K. Lee
*Director of the United States Patent and Trademark Office*